United States Patent [19]

Möckli

[11] 4,089,647
[45] May 16, 1978

[54] PROCESS FOR THE DYEING OF PAPER MATERIAL

[75] Inventor: Peter Möckli, Basel, Switzerland

[73] Assignee: Ciba-Geigy AG, Basel, Switzerland

[21] Appl. No.: 767,591

[22] Filed: Feb. 10, 1977

[30] Foreign Application Priority Data

Mar. 18, 1976 Switzerland ............... 3405/76

[51] Int. Cl.² .............................. D21H 1/46
[52] U.S. Cl. ............................... 8/7; 8/1 W; 8/177 AB; 162/162
[58] Field of Search ............. 8/7, 1 W, 177 AB; 162/162

[56] References Cited

U.S. PATENT DOCUMENTS

| 2,695,290 | 11/1954 | Finkelstein et al. | 260/240 |
| 2,906,588 | 9/1959 | Brunkhorst et al. | 8/177 AB |
| 3,409,626 | 11/1968 | Cavallito et al. | 260/296 |
| 3,653,899 | 4/1972 | Haefner et al. | 96/48 |
| 3,832,184 | 8/1974 | Sato et al. | 96/101 |
| 3,888,850 | 6/1975 | Entschel et al. | 8/7 |

FOREIGN PATENT DOCUMENTS

| 2,263,529 | 7/1973 | Germany. |
| 1,956,667 | 10/1969 | Germany. |
| 970,601 | 9/1964 | United Kingdom. |

OTHER PUBLICATIONS

Castle, L. N. et al., Journal of Organic Chemistry, vol. 24, (1959), pp. 1189–1192).
Allen, R. C. et al., Jour. of Med. Chem., vol. 13, No. 15, 1970, pp. 909–912.
Cavallito, C. J. et al., J. Med. Chem., vol. 13, No. 2, 1970, pp. 221–224.
Akkerman, A. M. et al., Recueil, 1954, pp. 629–647.

Primary Examiner—Joseph L. Schofer
Assistant Examiner—Maria S. Tungol
Attorney, Agent, or Firm—Edward McC. Roberts; Probodh I. Almaula

[57] ABSTRACT

A process for the dyeing of paper material from an aqueous medium, comprising the use of at least one water-soluble dye of the formula

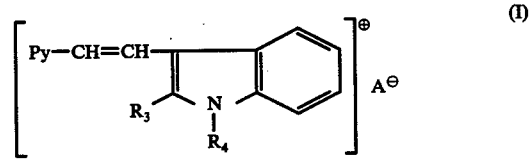

(I)

wherein
Py represents a pyridyl group of the formula

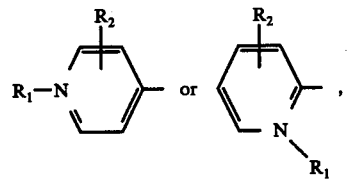

$R_1$ represents lower alkyl, substituted lower alkyl, allyl, or benzyl,
$R_2$ represents hydrogen, halogen, methyl or ethyl,
$R_3$ represents hydrogen, methyl, ethyl or phenyl,
$R_4$ represents hydrogen, lower alkyl substituted lower alkyl, or allyl, and
$A^{\ominus}$ represents an anion.

13 Claims, No Drawings

PROCESS FOR THE DYEING OF PAPER MATERIAL

The invention relates to a process for the dyeing of paper material using water-soluble cationic methine dyes, to dye preparations containing these dyes, as well as to the paper material dyed by this process.

There is a need for deeply-coloured brilliant yellow dyes which exhibit a high substantivity or groundwood pulp and on unbleached celluloses.

It has now been found that water-soluble dyes of the formula

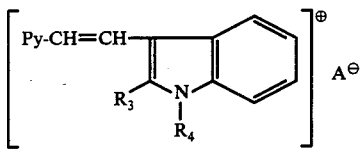
(I)

wherein

Py represents a pyridyl group of the formula

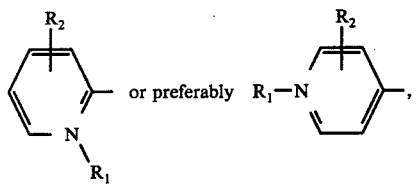

$R_1$ represents optionally substituted lower alkyl, allyl, or benzyl, especially alkyl having 1 to 2 carbon atoms or β-hydroxyethyl;

$R_2$ represents hydrogen, halogen such as fluorine, chlorine or bromine, methyl or ethyl, particularly hydrogen or methyl;

$R_3$ represents hydrogen, methyl, ethyl or phenyl, especially hydrogen or methyl, $R_4$ represents hydrogen, optionally substituted lower alkyl or allyl, particularly hydrogen or methyl, and $A^\ominus$ represents an anion, have the required properties and are eminently suitable for dyeing paper material in deeply coloured, brilliant yellow shades.

They build up well and are therefore suitable for light, medium and deep dyeings. Paper material dyed with these dyes has good fastness to water. Furthermore, the dyes can be combined with other paper dyes to produce different shades.

If $R_1$ and $R_4$ represent an optionally substituted lower alkyl group, then the groups concerned are identical or different straight-chain or branched-chain alkyl groups, such as methyl, ethyl, n- or isopropyl, n-, sec.- or tert.- butyl, which can be optionally substituted, e.g. with chlorine, hydroxy or cyano, such as the —$C_2H_4Cl$, —$C_2H_4OH$ or —$C_2H_4CN$ group. Where not otherwise specified, "lower alkyl" in this specification and claims means an alkyl group having from 1 to 4 carbon atoms.

$A^\ominus$ as anion represents a water-soluble acid anion, such as the $ZnCl_3^\ominus$-group, a methosulfate, sulfate, nitrate, phosphate, formate, acetate, halogenoacetate, cyanoacetate or lactate group, and in particular a halogen atom such as fluorine and, preferably, chlorine or bromine.

Also anions other than those mentioned can be associated with the dyes according to the invention, with the type of anions used being selected on the basis of the degree of solubility which it imparts to the respective dye. On the other hand, the degree of solubility that is suitable varies depending on the specific purpose for which the particular dye being produced is to be used. Thus any such dyestuff compatible anion can be utilized.

Of quite special interest are dyes of the formula

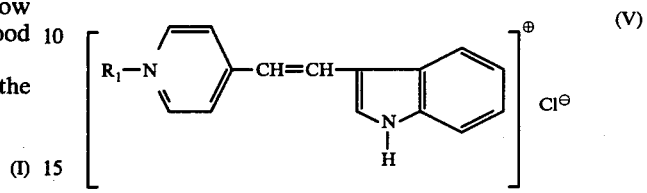
(V)

wherein $R_1$ represents methyl or β-hydroxyethyl. These dyes have an especially high tinctorial strength and have particularly good solubility in cold water, and consequently the production of highly concentrated, stable commercial preparations free of solvents is rendered possible.

The compounds of the formula I usable according to the invention are known as sensitizers, and can be produced by known methods; for example, they can be produced by condensation of the corresponding indole-3-aldehyde or of a reactive derivative thereof (e.g. acetal) with an N-alkylated picolinium compound, preferably in the presence of a basic condensation agent, according to the following reaction sequence:

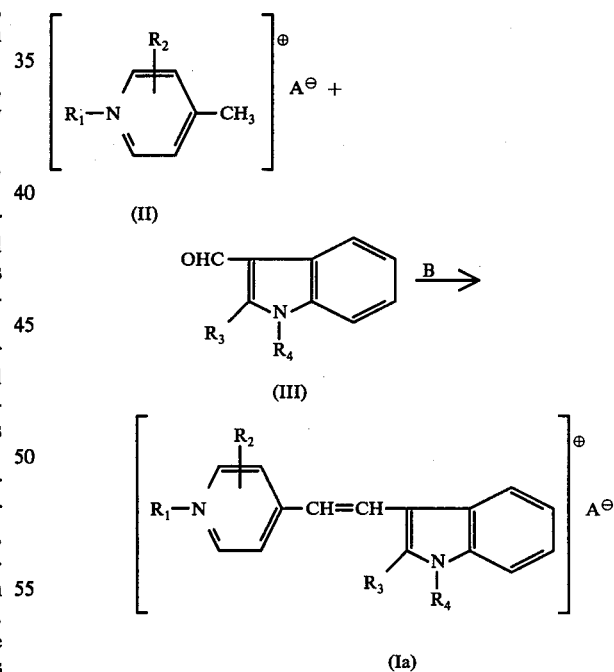

wherein B represents a base, preferably piperidine or a slightly basic ion-exchanger resin, such as ®Amberlite IR 45, and wherein $R_1$, $R_2$, $R_3$, $R_4$ and $A^\ominus$ have the above-given meanings. The reaction is preferably performed in a solvent, such as a lower alkanol (e.g. ethanol, iso-propanol or butanol), a glycol, dimethylformamide, pyridine or chloroform.

The compounds of the formula (I) can also be produced by quaternising a compound of the formula

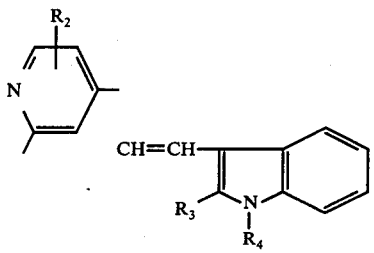

with a usual alkylating agent which introduces the $R_1$ radical, such as methyl halide, dimethyl sulfate, p-toluenesulfonic acid methyl ester, allyl chloride, β-chloroethanol, etc.

The compounds of the formula (IV) can be produced from the corresponding pyridine aldehydes and the corresponding 3-indolymethyl-phosphonium chlorides by the Wittig method.

For dyeing paper material, the dyes usable according to the invention can be in the form of dry dye-powder or, advantageously, in the form of aqueous liquid preparations. The liquid preparations are produced by customary methods. Since the dyes in some cases are very readily soluble in water, these dyes can be used simply as concentrated aqueous solutions. If necessary, however, further additives can be used, such as solubility-promoting agents, e.g. acetic acid and, optionally, other auxiliaries, such as antifreeze agents (glycols).

The composition of the liquid preparations can vary within a wide range, depending on the purpose of application and on the solubility of the dyes used. Preparations normally used have a content of 5 to 70 percent by weight of dye and 95 to 30 percent by weight of water, especially 25 to 60 percent by weight of dye and 75 to 40 percent by weight of water. Where further additives are concomitantly used, the amount of water is reduced accordingly.

The cationic dyes of the formula I usable according to the invention have a high substrate affinity for the paper fibres. The dyes consequently have a good backwater fastness. i.e. they do not contaminate the waste-liquors.

They are excellently suitable for dyeing paper materials in the pulp; they can also be used, however, for surface dyeing, e.g. in the size press. They are used, in particular, for dyeing
(a) packaging paper, e.g. card-board, packing paper, paper bags, wrapping paper, tissue paper, etc., from principally unbleached material and/or from material containing wood pulp, and
(b) printing papers made from wood pulp, such as papers for telephone books, timetables, magazines, newspapers, etc.

The invention is further illustrated by the following Examples but is not limited by them. Except where otherwise stated, all quantity values relate to weight. Temperatures are given in degrees Centigrade and "dH" denotes "German degrees of hardness" (deutsche Härtegrade).

EXAMPLE 1

(A) In a 2-liter autoclave,
287 parts of N-methyl-4-picolinium chloride,
613 parts of isopropanol,
261 parts of indole-3-aldehyde and
20 parts of piperidine are heated for 6 hours at a temperature of 82° to 85°. After cooling to room temperature, the easily stirrable suspension is filtered off under suction and the residue is subsequently washed with about 235 parts of isopropanol. After drying, there are obtained 463 parts of the dye

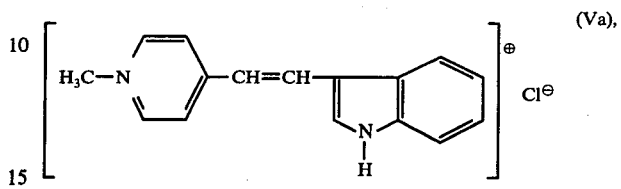

melting point 256° to 258°.

If the reaction is performed, instead of with N-methyl-4-picolinium chloride, with the corresponding bromide, iodide or methosulfate, then products are obtained having melting points of 236° to 256° (bromide), 259° to 261° (iodide), and 184° to 184° (methosulfate), respectively.

(B) A liquid form of the dye (Va) suitable for dyeing paper is obtained by a simple dissolving in water, whereby solutions having up to a 70% dye content are storage-stable without any further additives. Preferably, however, the liquid form is produced not by subjecting the press-cake containing isopropanol from Example 1 A) to a drying treatment but to a steam-distillation treatment until the whole of the solvent is removed. The dye then goes immediately into solution. There is obtained in this manner, for example, a 30% aqueous solution of the dye of the formula (Va) which is directly ready for use and which can be diluted to any desired extent for dyeing paper.

EXAMPLE 2

43 parts of N-methyl-2-picolinium chloride,
48 parts of N-methyl-indole-3-aldehyde,
350 parts of n-butanol and
3 parts of piperidine are refluxed for 90 minutes. The reaction mixture is then cooled and 214 parts of diethyl ether are added. The resulting fine precipitate is filtered off and washed with diethyl ether to obtain 45 parts of the dye of the formula

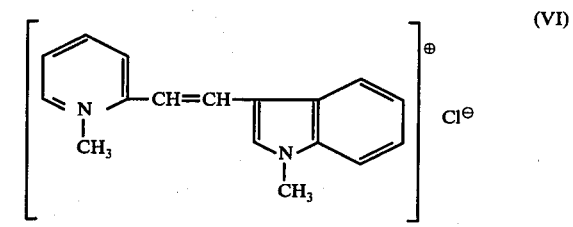

having the melting point: 242° to 244°.

EXAMPLE 3

If the N-methyl-indole-3-aldehyde in Example 2 is replaced by 2-methyl-indole-3-aldehyde, the procedure otherwise being as given in Example 2, then there are obtained 22 parts of the dye of the formula

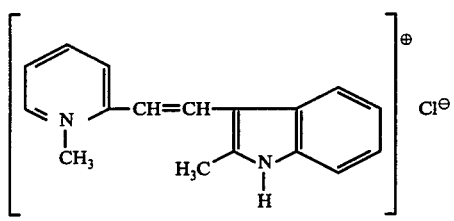

having a melting point of 237° to 240°.

EXAMPLE 4

9.3 parts of 4-picoline and
8.1 parts of β-chloroethanol
are refluxed for 1 hour. The reaction mixture is then diluted with 120 parts of n-butanol; 13.2 parts of indole-3-aldehyde and 1.5 parts of piperidine are added and the mixture is heated for 15 minutes at the reflux temperature. After cooling, the finely precipitated dye of the formula

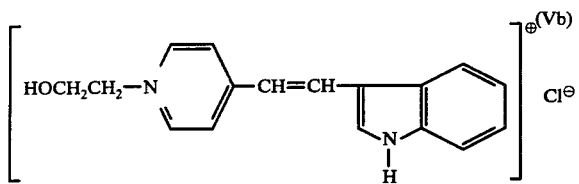

is filtered off and washed with a small amount of butanol and then with diethyl ether. Yield: 17.4 parts, melting point: 196° to 198°.

EXAMPLE 5

50 g of waste-paper (containing wood pulp) is beaten up in a liter of water at room temperature (10° dH) to obtain a fibre suspension.

The suspension is subsequently diluted with 1 liter of the same water. To the pulp suspension there is then added 1 g of a 20% aqueous solution of the dye of the formula

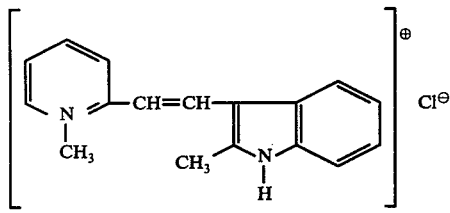

diluted with 10 ml of water, and the whole is gently stirred for 15 minutes.

The pulp suspension is diluted with water to produce a 0.5% suspension, and paper sheets of 80 g/m² are formed therefrom on a laboratory sheet-former (Franck) and then dried for 5 minutes at 100° C. There is obtained a Schrenz paper dyed light-yellow having good fastness to water. The waste-liquor is only very slightly discoloured.

EXAMPLE 6

15 kg of waste-paper (containing wood pulp) is beaten up in a pulper with 25 kg of bleached ground-wood pulp and 10 kg of unbleached sulfate pulp to obtain a 3% aqueous pulp suspension.

The pulp suspension is diluted in a dyeing vat to 2% and there are then added — relative to the absolutely dry total fibres — 0.5% of soluble, oxidatively degraded maize starch and 5% of kaolin.

There is then added directly 1.25 kg of a 5% aqueous solution of the dye of the formula

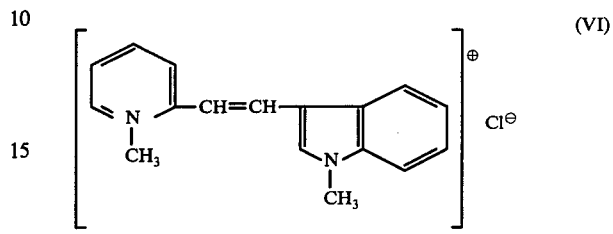

to the pulp suspension. After 20 minutes, 1% of a concentrated rosin-sized dispersion is added to the material in the mixing vat, and after 10 minutes' stirring, the pH-value is adjusted to 5 with alum immediately in front of the head box.

A bag paper having a weight of 80 g/m² is run out machine-glazed on the paper machine, which paper has a brilliant medium yellow shade having good fastness to water.

EXAMPLE 7

25 kg of scrap catalogue paper,
60 kg of bleached groundwood pulp (65° Schopper Riegler)
and 15 kg of unbleached sulphite pulp are beaten in a pulper with 2500 liters of water. 0.4% of soluble starch, 16% of kaolin and 2% of talcum (calculated on the dry fibres) are then beaten into the 4% aqueous pulp suspension.

The pulp suspension is subsequently ground in a refiner to 45° Schopper Riegler.

To the pulp suspension there is then added a 30% aqueous solution of the dye of the formula

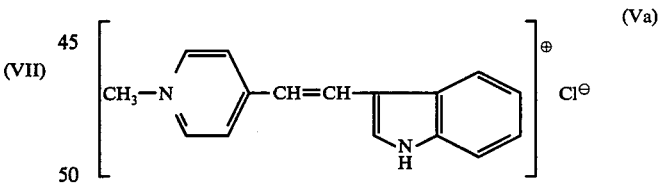

which corresponds to 1% of dry yellow dye, relative to the fibres.

After 15 minutes' exhaustion time, there is added to the pulp suspension, 0.6% of rosin-size dispersion (calculated on the dry fibres). After 10 minutes, the pulp suspension from the mixing vat is continuously diluted with water to 0.8% pulp density, and continuously adjusted with alum (commercial aluminum sulphate, $Al_2(SO_4)_3 \cdot 18H_2O$) to pH 4.5 (white water) and pumped into the head box.

The 60 g/m²-catalogue paper obtained is of a brilliant medium yellow shade having good fastness to water.

EXAMPLE 8

30 g of scrap telephone-book paper,
39 g of groundwood pulp and
31 g of semi-bleached cellulose are beaten up to obtain a 0.5% aqueous pulp dispersion. To this dispersion there are added 0.5% of soluble starch, 20% of kaolin and 1.5% of microtalcum, calculated on the fibres. Dyeing is effected without preliminary diluting by stirring for 20 minutes with 0.8 g of a 30% aqueous solution of the dye of the formula (Va) given in Example 7. The pH value of the pulp mixture is acidified after 10 minutes to 4.5 with alum, and paper sheets of 50 g/m² are formed. The paper has a light-yellow shade having good fastness to water.

EXAMPLE 9

If the procedure is carried out as given in Example 8 except that 28 g of a 1% aqueous solution of the dye bromide is used instead of the dye chloride used in Example 8, with the conditions otherwise being as described in Example 8, then similarly dyed yellow paper sheets are obtained.

I claim:

1. In a process for the dyeing of paper material with a dye in an aqueous medium, the improvement which comprises dyeing with at least one water-soluble dye of the formula

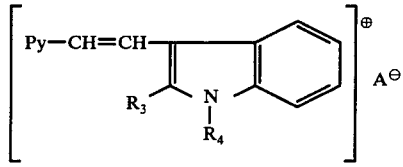

(I)

wherein
Py represents a pyridyl group of the formula

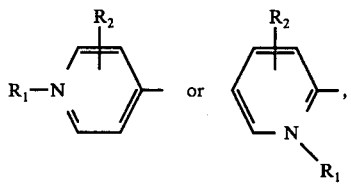

$R_1$ represents lower alkyl; lower alkyl substituted by chloro, hydroxy or cyano; allyl; or benzyl;
$R_2$ represents hydrogen, halogen, methyl or ethyl;
$R_3$ represents hydrogen, methyl, ethyl or phenyl;
$R_4$ represents hydrogen, lower alkyl; lower alkyl substituted by chloro, hydroxy or cyano; or allyl; and
$A^\ominus$ represents an anion.

2. The process of claim 1, wherein $A^\ominus$ represents halide, trichlorozincate, methosulfate, sulfate, nitrate, phosphate, formate, acetate, haloacetate, cyanoacetate or lactate.

3. The process of claim 1, wherein $A^\ominus$ represents chloride or bromide.

4. The process of claim 1, wherein $R_1$ represents alkyl having 1 to 2 carbon atoms or β-hydroxyethyl.

5. The process of claim 1, wherein $R_2$ represents hydrogen or methyl.

6. The process of claim 1, wherein $R_3$ represents hydrogen or methyl.

7. The process of claim 1, wherein $R_4$ represents hydrogen or methyl.

8. The process of claim 1, wherein Py represents a pyridyl group of the formula

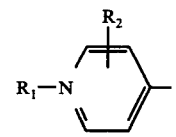

9. The process of claim 1, wherein the dye is of the formula

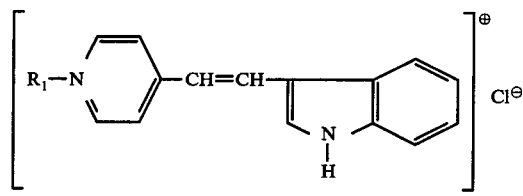

wherein $R_1$ represents methyl or β-hydroxyethyl.

10. The process of claim 1, wherein the paper material is paper pulp.

11. The process of claim 10, wherein the paper pulp is groundwood pulp.

12. The process of claim 10, wherein the paper pulp is sulfate pulp or sulfite pulp.

13. Paper material dyed with a dye in an aqueous medium, wherein the dye is selected from the group consisting of

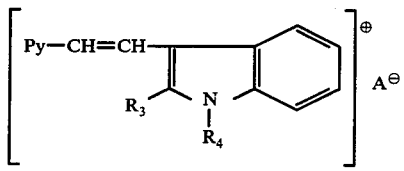

wherein
Py represents a pyridyl group of the formula

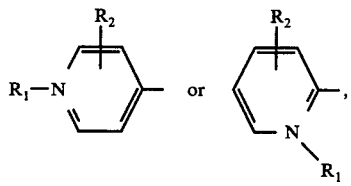

$R_1$ represents lower alkyl; lower alkyl substituted by chloro, hydroxy or cyano; allyl; or benzyl;
$R_2$ represents hydrogen, halogen, methyl or ethyl;
$R_3$ represents hydrogen, methyl, ethyl or phenyl;
$R_4$ represents hydrogen, lower alkyl; lower alkyl substituted by chloro, hydroxy or cyano; or allyl; and
$A^\ominus$ represents an anion.

* * * * *